L. RASCH.
INDICATOR OF SPEED FOR CENTRIFUGAL SEPARATORS.
APPLICATION FILED FEB. 26, 1920.
1,428,905.                                             Patented Sept. 12, 1922.
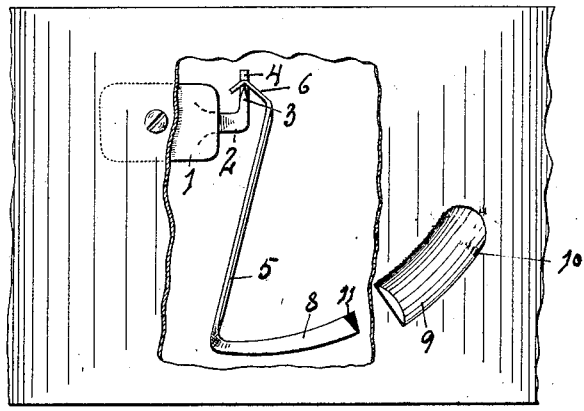
Fig. 1
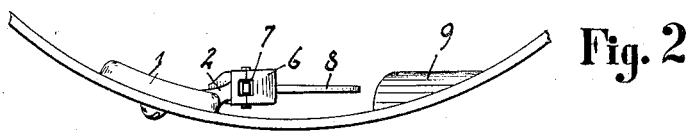
Fig. 2
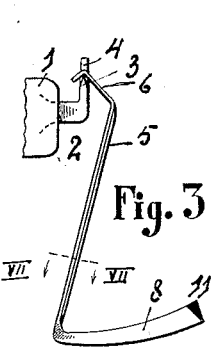
Fig. 3
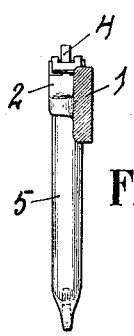
Fig. 4
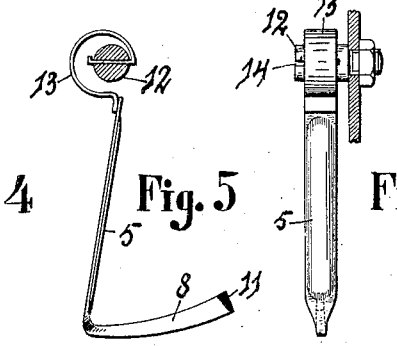
Fig. 5
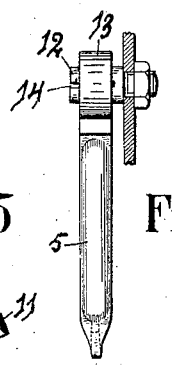
Fig. 6
Fig. 7
Inventor-
Ludvik Rasch
By B. Singer, Atty.

Patented Sept. 12, 1922.

1,428,905

UNITED STATES PATENT OFFICE.

LUDVIK RASCH, OF CHRISTIANIA, NORWAY.

INDICATOR OF SPEED FOR CENTRIFUGAL SEPARATORS.

Application filed February 26, 1920. Serial No. 361,476.

*To all whom it may concern:*

Be it known that I, LUDVIK RASCH, a subject of the King of Norway, residing at Christiania, Norway, have invented a new and useful Indicator of Speed for Centrifugal Separators, of which the following is a specification.

The present invention relates to speed indicators for cream separators of the turbine driven type, and has for its object a simple and effective device capable of indicating correctly the speed of revolution of the separator drum.

The object of the invention is to provide a speed indicator for such purpose which is accurate and reliable, simple and inexpensive, which takes up no place outside the drum and which may be easily applied to the cream separator without requiring change in the mechanism.

To these ends the invention consists in certain improvements as will be hereinafter more fully described, the novel features being pointed out particularly in the claims.

In the accompanying drawing:—

Fig. 1 is a side view showing a part of a separator casing provided with the device, the drum being for the sake of clearness partly broken away.

Fig. 2 is a plan view showing the arrangement of the device between the separator casing and the drum.

Fig. 3 is a side view showing a wing.

Fig. 4 is a side view at a right angle to Fig. 3 showing the wing and a part of its bearing mechanism.

Fig. 5 is a view similar to Fig. 4 showing another form of the bearing mechanism.

Fig. 6 is a side view at a right angle to Fig. 5.

Fig. 7 is a sectional view on the line VII—VII, Fig. 3.

Referring to Figs. 1 to 4, 1 designates a block on the inner side of the wall of the casing. To this block is in a suitable manner fixed an arm 2 having a sharp edge 3 directed upwards and a tongue 4 rising from the center of the edge. The wing 5 is provided at its upper end with a saddle 6 having an aperture 7 through which the tongue 4 is projecting for the purpose of preventing the wing from being deranged. The wing is suitably concaved in order that the air current may act effectively upon the same and the wing obtain sufficient stiffness. At its lower end the wing is furnished with an arc 8 intended to move into a depression 9 pressed in from the outside of the casing. In this depression is a mark 10 and upon the arc is another mark 11. When the correct speed is reached the mark 11 should point upon the mark 10.

According to Figs. 5 and 6, the wing 5 is connected to a bearing pivot 12 by means of a bent leaf spring 13 fastened in a slot 14 in the pivot.

In order to adjust the effect the wing may be provided with a movable weight, (not shown).

Having described my invention, I claim:

1. In a speed indicator for a cream separator, a bearing consisting of an arm fastened to the inner side of the wall of the casing by means of a suitable block and provided with a sharp edge at a right angle to the casing, a tongue projecting upwards from the edge, a wing, having a saddle resting upon the said edge and provided with an aperture for receiving the mentioned tongue, and arranged so as to oscillate in the space between the drum and the wall of the casing, an arc fastened to the lower end of the wing, and a depression forming an opening arranged in the wall of the casing so as to allow the arc to swing outside the casing.

2. In a speed indicator for a cream separator, a block fastened to the inner side of the wall of the casing, an arm connected to the block and provided with a sharp edge, a tongue projecting upwards from the edge, a wing having a saddle, resting upon the edge, an aperture in the saddle for receiving the said tongue, an arc extending from the wing, a depression forming an opening in the casing to receive the said arc when swinging outwards.

Christiania, the 28th of Jan., 1920.

LUDVIK RASCH.

Witnesses:
NATH. A. PEDENSCHOÜ,
A. B. COOK.